United States Patent
Wang et al.

(10) Patent No.: US 11,394,906 B2
(45) Date of Patent: Jul. 19, 2022

(54) IMAGE ACQUISITION STRUCTURE, DRIVING METHOD THEREOF AND DISPLAY DEVICE

(71) Applicant: BOE TECHNOLOGY GROUP CO., LTD., Beijing (CN)

(72) Inventors: Wenjuan Wang, Beijing (CN); Lei Wang, Beijing (CN); Yapeng Li, Beijing (CN); Yuanyuan Ma, Beijing (CN); Yubo Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/358,262

(22) Filed: Jun. 25, 2021

(65) Prior Publication Data

US 2022/0201227 A1    Jun. 23, 2022

(30) Foreign Application Priority Data

Dec. 23, 2020 (CN) .......................... 202011535514.9

(51) Int. Cl.
  *G06V 40/13* (2022.01)
  *H04N 5/355* (2011.01)
  *H04N 5/3745* (2011.01)
  *H04N 5/369* (2011.01)

(52) U.S. Cl.
  CPC ............. *H04N 5/355* (2013.01); *G06V 40/13* (2022.01); *G06V 40/1318* (2022.01); *H04N 5/3698* (2013.01); *H04N 5/37455* (2013.01); *H04N 5/37457* (2013.01)

(58) Field of Classification Search
  None
  See application file for complete search history.

(56) References Cited

U.S. PATENT DOCUMENTS

| | | | |
|---|---|---|---|
| 2008/0075330 A1* | 3/2008 | Matsumura | G06V 40/1318 382/115 |
| 2019/0288020 A1* | 9/2019 | Ikuma | H04N 5/35554 |
| 2021/0004556 A1* | 1/2021 | Reinhold | G06V 40/1318 |

* cited by examiner

*Primary Examiner* — Joseph R Haley
(74) *Attorney, Agent, or Firm* — Calfee, Halter & Griswold LLP

(57) ABSTRACT

An image acquisition structure includes a dimming layer, a processing circuit, a plurality of reference circuits and a plurality of image acquisition circuits. The reference circuit includes a first photosensor. The dimming layer is provided on a light incident side of the first photosensor, and covers at least the first photosensor of the reference circuit. An input terminal of the processing circuit is electrically connected to an output terminal of the reference circuit. Input terminals of the plurality of image acquisition circuits are electrically connected to an output terminal of the processing circuit.

20 Claims, 5 Drawing Sheets

IMAGE ACQUISITION STRUCTURE, DRIVING METHOD THEREOF AND DISPLAY DEVICE

CROSS-REFERENCE TO RELATED APPLICATIONS

This application is based upon and claims priority to Chinese Patent Application No. 202011535514.9, filed Dec. 23, 2020, the entire contents of which are incorporated herein by reference.

TECHNICAL FIELD

The present disclosure relates to the field of image acquisition technology, and more specifically, to an image acquisition structure, a driving method for the image acquisition structure and a display device including the image acquisition structure.

BACKGROUND

With an increasing demand for a full screen, an under-screen fingerprint recognition has become a research hotspot of a mobile phone fingerprint recognition. An optical fingerprint recognition is one of commonly used fingerprint recognition methods. A commonly used image acquisition method is to use an OLED (Organic Electroluminesence Display) as an active light source and use a PIN photodiode as a photosensor to distinguish fingerprint valley ridge signals by sensing different light reflections of fingerprint valley ridges. Where changing ambient light is one of important factors affecting an optical image acquisition. When external ambient light is very strong, the PIN tends to be saturated and an image of the fingerprint valley ridge is blurred. Reducing integration time is a way to slow down saturation of the PIN, but it will cause that a difference between light intensities reflected by the valley ridges is very small, so that a difference between images formed by the valley ridges becomes smaller, even to an extreme noise level, which makes it impossible to distinguish. At the same time, under the strong ambient light, even if the integration time is very small, the PIN will reach the saturation. Another method is to increase a PIN dynamic range from an apparatus, which involves a wide range and complexity.

The information disclosed above in the background section is only used to enhance the understanding of the background of the present disclosure, so it may include information that does not constitute the prior art known to those of ordinary skill in the art.

SUMMARY

Additional aspects and advantages of the present disclosure will be set forth in part in the following description, and will become apparent in part from the description, or may be learned through the practice of the present disclosure.

In accordance with one aspect of the present disclosure, an image acquisition structure is provided. The image acquisition structure includes:

a plurality of reference circuits, the reference circuit including a first photosensor;

a dimming layer provided on a light incident side of the first photosensor, and the dimming layer covering at least the first photosensor of the reference circuit;

a processing circuit having an input terminal electrically connected to an output terminal of the reference circuit; and a plurality of image acquisition circuits having input terminals electrically connected to an output terminal of the processing circuit;

wherein the reference circuit is configured to receive light rays incident passing through the dimming layer, and output an electrical signal based on a light intensity of the light rays; the processing circuit is configured to calculate an adjustment electrical signal based on the electrical signal output by the reference circuit, and adjust an input electrical signal of the image acquisition circuit based on the adjustment electrical signal; and the image acquisition circuit is configured to receive light rays incident without passing through the dimming layer and the input electrical signal to realize an image acquisition.

In accordance with one aspect of the present disclosure, a display device is provided, including: the image acquisition structure according to any one of above items.

In accordance with one aspect of the present disclosure, a driving method for an image acquisition structure is provided, which is suitable for the image acquisition structure according to any one of above items, including:

receiving, by a reference circuit, light rays incident passing through a dimming layer and outputting an electrical signal based on a light intensity of the light rays;

calculating, by a processing circuit, an adjustment electrical signal based on the electrical signal output by the reference circuit, and adjusting an input electrical signal of an image acquisition circuit based on the adjustment electrical signal; and receiving, by the image acquisition circuit, light rays and the input electrical signal to realize an image acquisition.

BRIEF DESCRIPTION OF THE DRAWINGS

The above and other features and advantages of the present disclosure will become more apparent by describing exemplary embodiments in detail with reference to the accompanying drawings.

DETAILED DESCRIPTION

Figure 1:
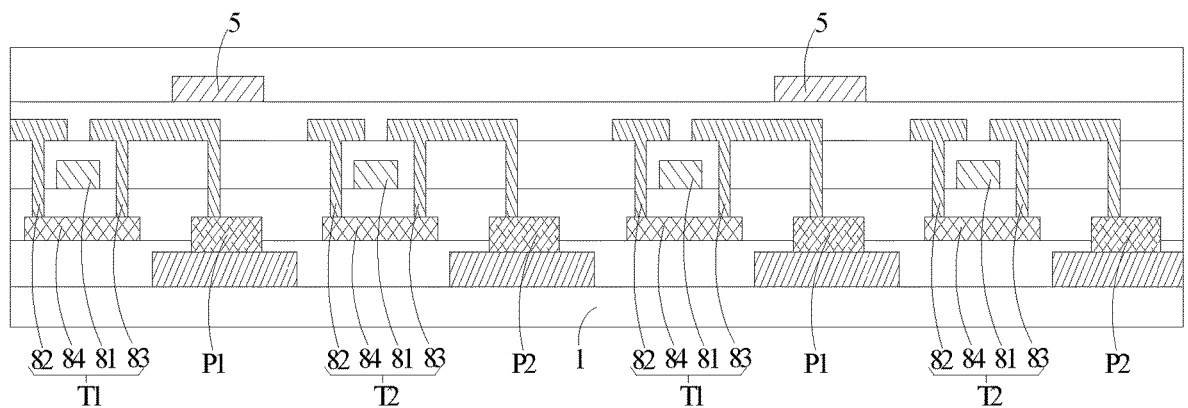
FIG. 1 is a structural schematic diagram of a first exemplary embodiment of an image acquisition structure of the present disclosure.

Exemplary embodiments will now be described more comprehensively with reference to the accompanying drawings. However, the exemplary embodiments can be implemented in various forms, and should not be understood to being limited to the embodiments set forth herein; instead, these embodiments are provided so that the present disclosure will be comprehensive and complete, and concepts of the exemplary embodiments are fully conveyed to those skilled in the art. The same reference numerals in the drawings indicate the same or similar structures, and thus their detailed descriptions will be omitted.

The exemplary embodiment first provides an image acquisition structure. Referring to a structural schematic diagram of an exemplary embodiment of an image acquisition structure of the present disclosure illustrated in FIG. 1, FIG. 2 and FIG. 3, the image acquisition structure may include a dimming layer 5, a processing circuit 3, a plurality of reference circuits 2 and a plurality of image acquisition circuits 4; the reference circuit 2 includes a first photosensor P1; the dimming layer 5 is provided on a light incident side of the first photosensor P1, and the dimming layer 5 covers at least the first photosensor P1 of the reference circuit 2; an input terminal of the processing circuit 3 is electrically connected to an output terminal of the reference circuit 2; an input terminal of the image acquisition circuit 4 is electrically connected to an output terminal of the processing circuit 3; where the reference circuit 2 is configured to receive light rays incident passing through the dimming layer 5 and output an electrical signal based on a light intensity of the light rays; the processing circuit 3 is configured to calculate an adjustment electrical signal based on the electrical signal output by the reference circuit 2 and adjust an input electrical signal of the image acquisition 4 based on the adjustment electrical signal; the image acquisition circuit 4 is configured to receive light rays incident without passing through the dimming layer 5 and the input electrical signal to realize an image acquisition.

In the image acquisition structure of the present disclosure, the dimming layer 5 covers at least the first photosensor P1 of the reference circuit 2, so that the light intensity entering the first photosensor P1 is weakened; the input electrical signal of the image acquisition circuit 4 is dynamically adjusted based on a response of the first photosensor P1 of the reference circuit 2, so that the image acquisition circuit 4 will not enter a saturation region and a fingerprint recognition under strong ambient light is easier and clearer; the electrical signal output by the reference circuit 2 changes with a change of the ambient light, so that the adjustment electrical signal also changes with the change of the ambient light, thereby realizing a dynamic adjustment with different ambient light and realizing an adaptive acquisition under different ambient light.

Figure 3:
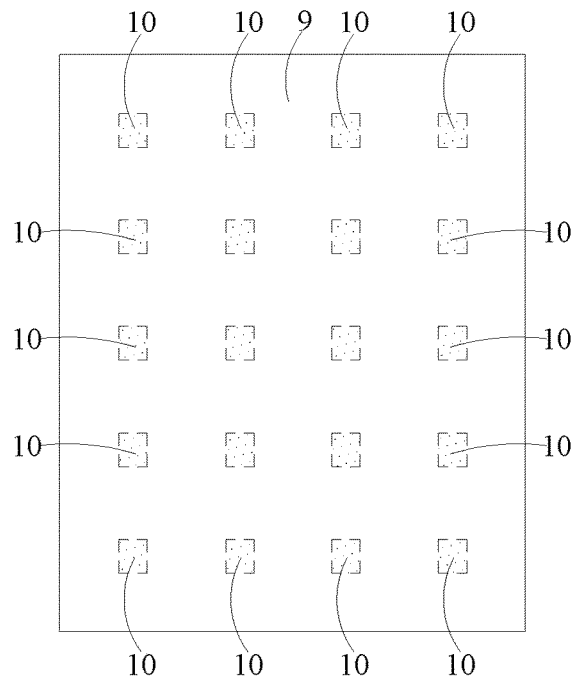
FIG. 3 is a top view structural schematic diagram of the image acquisition structure in FIG. 1.

Referring to FIG. 1 and FIG. 3, in the exemplary embodiment, the image acquisition structure may include a substrate base 1. The substrate base 1 may be a glass base or a flexible base, for example, a polyamide resin base or a plastic base, etc. The substrate base 1 has an image acquisition area 9 and a plurality of reference areas 10, and the plurality of reference areas 10 may not be connected to each other, so that the image acquisition area 9 is connected as a whole, and the plurality of reference areas 10 are arranged in an array. A conductive layer is provided on the substrate base 1, and the conductive layer forms a first electrode of the first photosensor P1 and a first electrode of a second photosensor P2.

The plurality of reference circuits 2 may be provided in the plurality of reference areas 10 in a one-to-one correspondence, that is, one reference circuit 2 is provided in one reference area 10. The reference circuit 2 may include the first photosensor P1, a first switching transistor T1 and a first output circuit 21, etc.

The plurality of image acquisition circuits 4 are provided in the image acquisition area 9, and the input terminal of the image acquisition circuit 4 is electrically connected to the output terminal of the processing circuit 3. The image acquisition circuit 4 may include the second photosensor P2, a second switching transistor T2, a second output circuit 41, etc.

The first photosensor P1 and the second photosensor P2 may be the same, for example, both may receive optical signals and convert the optical signals into electrical signals, and satisfy those responses increase with increases of the light intensity. Such setting may enable the response of the first photosensor P1 positively correlate with that of the second photosensor P2, that is convenient to control an input electrical signal of the second photosensor P2 by the electrical signal output by the first photosensor P1 subsequently. Of course, in other exemplary embodiments of the present disclosure, the first photosensor P1 and the second photosensor P2 may be different, a relationship between the light intensity received by the first photosensor P1 and the electrical signal output by the first photosensor P1 may be clarified and a relationship between the light intensity received by the second photosensor P2 and the electrical signal output by the second photosensor P2 may be clarified; it is adjusted by the processing circuit 3 so as to dynamically control the input electrical signal of the second photosensor P2 by the electrical signal output by the first photosensor P1.

Both the first photosensor P1 and the second photosensor P2 may include a first electrode, a second electrode, and a photosensitive layer sandwiched between the first electrode and the second electrode.

For example, both the first photosensor P1 and the second photosensor P2 may be implemented as photodiodes, such as PN or PIN photodiodes, avalanche photodiodes, etc. The photosensitive layer, for example, includes a PN junction or a PIN junction. For example, the photosensitive layer may be made of an inorganic photosensitive material, such as a germanium-based or a silicon-based material; for example, the photosensitive layer may also be an organic photosensitive material.

For example, both the first photosensor P1 and the second photosensor P2 may also be implemented as metal-semiconductor-metal photosensors, and the photosensitive layer forms Schottky contact with the first electrode and the second electrode respectively. For example, the photosensitive layer includes at least one of indium gallium arsenide (InGaAs), amorphous silicon, molybdenum sulfide, indium gallium zinc oxide, polycrystalline silicon, amorphous selenium, mercury iodide, lead oxide, microcrystalline silicon, nanocrystalline silicon, single crystal silicon, perylene tetracarboxylic acid bis-benzimidazole, silicon nanowires and copper phthalocyanine (CuPc).

For example, both the first photosensor P1 and the second photosensor P2 may also be implemented as other types of photosensors such as photosensitive thin film transistors. The exemplary embodiment of the present disclosure does not limit the type of the photosensor.

Please continue to refer to FIG. 1, the dimming layer 5 is provided on a side of the first photosensor P1 away from the substrate base 1, and an orthographic projection of the first photosensor P1 on the substrate base 1 is located within an orthographic projection of the dimming layer 5 on the substrate base 1, that is, the dimming layer 5 covers at least the first photosensor P1 completely, and the first photosensor P1 is located on a light emitting side of the dimming layer 5, that is, the dimming layer 5 is provided on a light incident side of the first photosensor P1, so that the light rays passes through the dimming layer 5 to enter the first photosensor P1.

A light transmittance of the dimming layer 5 is greater than or equal to 20% and less than or equal to 4%, so that the response of the first photosensor P1 will not reach saturation, and the input electrical signal of the second photosensor P2 may always be controlled by the electrical signal output by the first photosensor P1; moreover, due to a light shielding effect of the dimming layer 5, the response of the first photosensor P1 is always smaller than that of the second photosensor P2. Even when fingers are pressed on the acquisition area, the second photosensor P2 may be guaranteed to work in an acquisition mode.

The material of the dimming layer 5 may be silicon nitride, silicon oxide, silicon oxynitride, etc.

The first switching transistor T1 and the second switching transistor T2 are implemented by thin film transistors provided on the substrate base 1. The thin film transistor includes an active layer 84, a source 82, a drain 83, and a gate 81. Specifically, the gate 81 of the thin film transistor is a control terminal of the first switching transistor T1 and a control terminal of the second switching transistor T2, and the source 82 of the thin film transistor is a first terminal of the first switching transistor T1 and a first terminal of the second switching transistor T2, and the drain 83 of the thin film transistor is a second terminal of the first switching transistor T1 and a second terminal of the second switching transistor T2.

Figure 2:
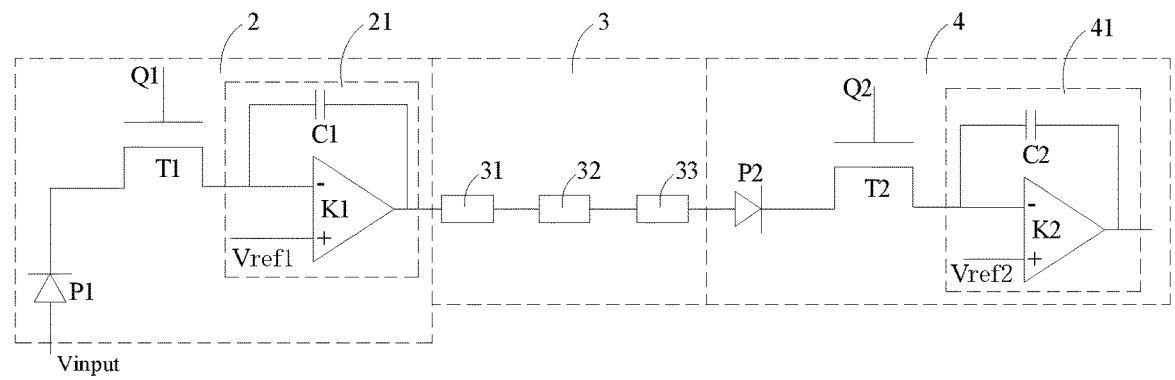
FIG. 2 is a circuit structural schematic diagram of the image acquisition structure in FIG. 1.

In the exemplary embodiment, referring to FIG. 1 and FIG. 2, the reference circuit 2 may be provided with the image acquisition circuit 4 in one-to-one correspondence, that is, one reference circuit 2 is connected to one image acquisition circuit 4, one image acquisition circuit 4 is controlled by one reference circuit 2, and the first photosensor P1 and the second photosensor P2 are provided adjacent to each other, so that the first photosensor P1 and the second photosensor P2 receive the ambient light basically the same, and improve control accuracy. Each first photosensor P1 corresponds to one first switching transistor T1 and one first output circuit 21, and each second photosensor P2 corresponds to one second switching transistor T2 and one second output circuit 41.

The structure of the reference circuit 2 will be described in detail below.

Specifically, the first photosensor P1 may include the first electrode and the second electrode. The first electrode of the first photosensor P1 in the reference circuit 2 is connected to a power input terminal; the first photosensor P1 converts the received optical signal passing through the dimming plate 5 into the electrical signal. The first switching transistor T1 may include the first terminal, the second terminal and the control terminal. The first terminal of the first switching transistor T1 is electrically connected to the second electrode of the first photosensor P1, and the control terminal of the first switching transistor T1 is electrically connected to a first control terminal Q1; the first switch transistor T1 is used to control on/off between the first photosensor P1 and the first output circuit 21. The input terminal of the first output circuit 21 is electrically connected to the second terminal of the first switching transistor T1, and the output of the first output circuit 21 is electrically connected to the processing circuit 3.

The first output circuit 21 may include a first operational amplifier K1 and a first capacitor C1; the first operational amplifier K1 and the first capacitor C1 constitute an integrator. The integrator may integrate a current signal to obtain an voltage signal, which is convenient for reading and processing of the circuit subsequently. The first operational amplifier K1 may include an input terminal, a reference terminal and an output terminal. The input terminal of the first operational amplifier K1 is electrically connected to the second terminal of the first switching transistor T1 for receiving the electrical signal output by the first photosensor P1. The reference terminal of the first operational amplifier K1 is electrically connected to a first reference voltage terminal Vref1 for inputting a first reference voltage. The output terminal of the first operational amplifier K1 is electrically connected to the processing circuit 3 for outputting the voltage signal obtained by integration to the processing circuit 3. The first capacitor C1 may include a first terminal and a second terminal. The first terminal of the first capacitor C1 is electrically connected to the input terminal of the first operational amplifier K1, and the second terminal of the first capacitor C1 is electrically connected to the output terminal of the first operational amplifier K1.

The structure of the processing circuit 3 will be described in detail below.

The processing circuit 3 is electrically connected to the output terminal of the first output circuit 21, that is, the processing circuit 3 is electrically connected to the output terminal of the first operational amplifier K1. The processing circuit 3 is configured to calculate an adjustment electrical signal based on the electrical signal output by the first output circuit 21, and adjust the input electrical signal of the image acquisition circuit 4 based on the adjustment electrical signal.

Specifically, the processing circuit 3 may include an analog-to-digital conversion circuit 31, a processor 32 and a digital-to-analog conversion circuit 33; the analog-to-digital conversion circuit 31 may include an input terminal and an output terminal, the processor 32 may include an input terminal and an output terminal, and the digital-to-analog conversion circuit 33 may include an input terminal and an output terminal. The input terminal of the analog-to-digital conversion circuit 31 is electrically connected to the output terminal of the first output circuit 21 (the output of the first operational amplifier K1); the input terminal of the processor 32 is electrically connected to the output terminal of the analog-to-digital conversion circuit 31; the input terminal of the digital-to-analog conversion circuit 33 is electrically connected to the output terminal of the processor 32, and the output terminal of the digital-to-analog conversion circuit 33 is electrically connected to the image acquisition circuit 4. The processor 32 may a FPGA (Field Programmable Gate Array), a PC (Personal Computer), a microprocessor, etc.

The structure of the image acquisition circuit 4 will be described in detail below.

Specifically, the second photosensor P2 may include the first electrode and the second electrode, and the first electrode of the second photosensor P2 in the image acquisition circuit 4 is connected to the output terminal of the digital-to-analog conversion circuit 33 of the processing circuit 3; the second photosensor P2 converts the received optical signal reflected by a fingerprint without passing through the dimming plate 5 into the electrical signal. The second switching transistor T2 may include the first terminal, the second terminal and the control terminal. The first terminal of the second switching transistor T2 is electrically connected to the second electrode of the second photosensor P2, and the control terminal of the second switching transistor T2 is electrically connected a second control terminal Q2;

the second switch transistor T2 is used to control on/off between the second photosensor P2 and the second output circuit 41. The input terminal of the second output circuit 41 is electrically connected to the second terminal of the second switching transistor T2, the output terminal of the second output circuit 41 is electrically connected to an image processing unit to convert the electrical signal output by the second output circuit 41 into an image to realize an image recognition.

The second output circuit 41 may include a second operational amplifier K2 and a second capacitor C2; the second operational amplifier K2 and the second capacitor C2 constitute an integrator. The integrator may integrate a current signal to obtain an voltage signal, which is convenient for reading and processing of the circuit subsequently. The second operational amplifier K2 may include an input terminal, a reference terminal, and an output terminal. The input terminal of the second operational amplifier K2 is electrically connected to the second terminal of the second switching transistor T2 for receiving the electrical signal output by the second photosensor P2. The reference terminal of the second operational amplifier K2 is electrically connected to a second reference voltage terminal Vref2 for inputting a second reference voltage. The output terminal of the second operational amplifier K2 is electrically connected to the image processing unit for outputting the voltage signal obtained by integration to the image processing unit. The second capacitor C2 may include a first terminal and a second terminal. The first terminal of the second capacitor C2 is electrically connected to the input terminal of the second operational amplifier K2, and the second terminal of the second capacitor C2 is electrically connected to the output terminal of the second operational amplifier K2.

Of course, in other exemplary embodiments of the present disclosure, it may be that at least one reference circuit 2 is provided between two adjacent image acquisition circuits 4, and at least one image acquisition circuit 4 is controlled by at least one reference circuit 2. It may be set as a relationship that one reference circuit 2 corresponds to the plurality of image acquisition circuits 4. For example, the image acquisition structure may be divided into a plurality of setting areas, one reference area is provided at a setting position in the setting area, one or more reference circuits 2 is(are) provided within one reference area, the plurality of image acquisition circuits 4 are provided around the reference area, and one dimming layer 5 is provided within one reference area, the dimming layer 5 covers the first photosensor(s) P1 in the setting area but does not cover the second photosensors P2. One reference circuit 2 may correspond to the plurality of image acquisition circuits 4 around it, by which the input electrical signals of the plurality of image acquisition circuits 4 around it are controlled. The plurality of reference circuits 2 may also be provided adjacently at the setting position in the setting area, and the plurality of reference circuits 2 correspond to the plurality of image acquisition circuits 4 together, that is, the input electrical signals of the plurality of image acquisition circuits 4 may be controlled by an average value or a median value of the plurality of reference circuits 2. In this case, a plurality of first photosensors P1 in the plurality of reference circuits 2 are arranged in an array at the setting position in the setting area, each first photosensor P1 corresponds to one first switching transistor T1, and the plurality of first photosensors P1 correspond to the same first output circuit 21; the control terminals of a plurality of first switching transistors T1 connected to the same first output circuit 21 are connected to different first control ports, thus on/off between the plurality of first photosensors P1 and one first output circuit 21 may be controlled respectively, so that the electrical signals output by the plurality of first photosensors P1 are transmitted to the first output circuit 21 in turn. A plurality of second photosensors P2 are arranged in an array in the setting area, each second photosensor P2 corresponds to one second switching transistor T2, and the plurality of second photosensors P2 correspond to the same second output circuit 41; the control terminals of a plurality of second switch transistors T2 connected to the same second output circuit 41 are connected to different second control ports, thus on/off between the plurality of second photosensors P2 and one second output circuit 41 may be controlled respectively, so that the electrical signals output by the plurality of second photosensors P2 are transmitted to the second output circuit 41 in turn.

Figure 4:
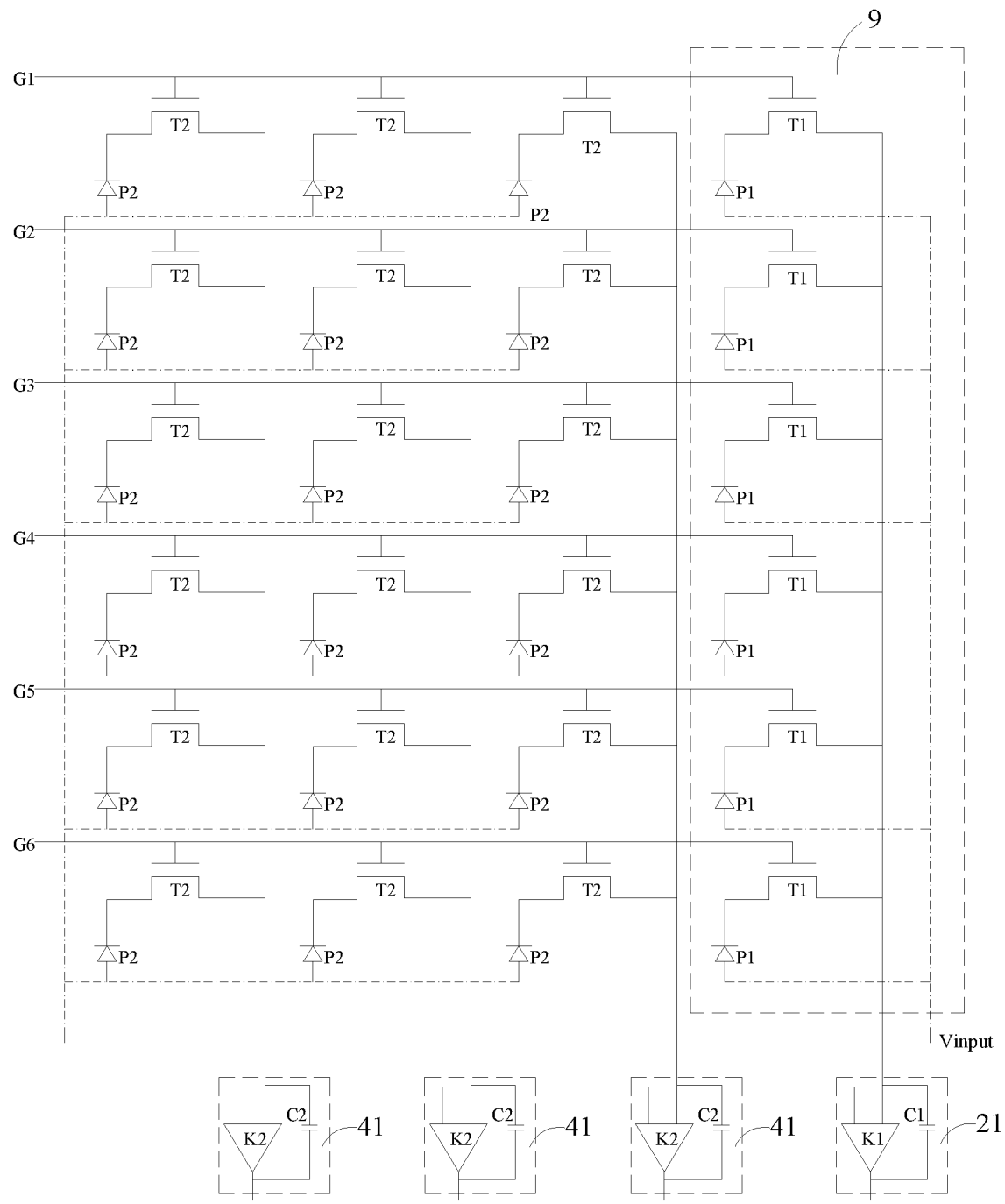
FIG. 4 is a circuit structural schematic diagram of a second exemplary embodiment of an image acquisition structure of the present disclosure.
Figure 5:
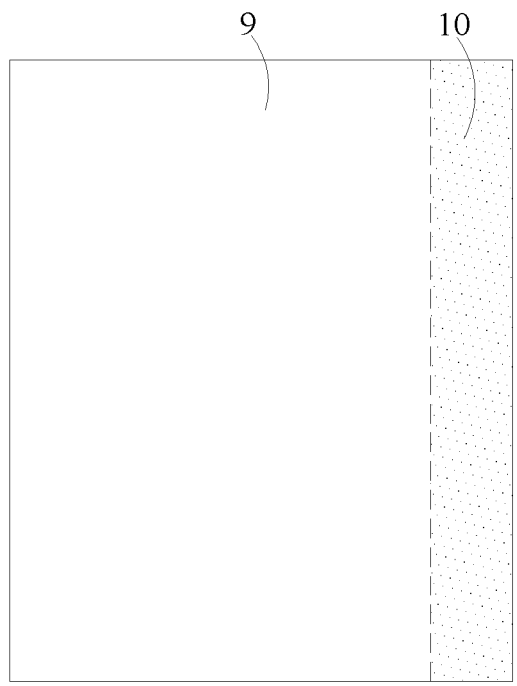
FIG. 5 is a structural schematic diagram of the image acquisition structure in FIG. 4.

Referring to FIG. 4 and FIG. 5, in some other exemplary embodiments of the present disclosure, the reference area 10 may be provided as one, and the reference area 10 may be provided in an edge region of the image acquisition structure. The plurality of first photosensors P1 and the plurality of first switching transistors T1 are provided in one reference area 10, and one first photosensor P1 is connected to one first switching transistor T1 correspondingly, which are arranged in an array after connection, the plurality of first switching transistors T1 in each column are connected to the same first output circuit 21 correspondingly. The first electrodes of the plurality of first photosensors P1 in each column are connected to the same power input terminal V input. The control terminals of the plurality of first switching transistors T1 in each column are connected to different first control ports (G1, G2, G3, G4, and G5), so that the plurality of first switching transistors T1 may be turned on at different times in turn to transmit the electrical signals of the plurality of first photosensors P1 to the first output circuit 21 in turn.

In the image acquisition area 9, one second photosensor P2 is connected to one second switch transistor T2 correspondingly. The plurality of second photosensors P2 and the plurality of second switching transistors T2 are also arranged in an array after connection, and way of array arrangement is the same as that of the first photosensors P1 and the first switching transistors T1, so that the plurality of second photosensors P2 and the plurality of second switching transistors T2 are located in the same row with one first photosensor P1 and one first switching transistor T1. The control terminals of the plurality of second switching transistors T2 in the same row and the control terminal of one first switching transistor T1 are connected to the same control port, that is, the first control port and the second control port are combined into one control port, which may turn on or turn off the plurality of second switching transistors T2 and one first switching transistor T1 in the same row simultaneously. The plurality of second switching transistors T2 located in the same column are connected to the same second output circuit 41 correspondingly. The control terminals of the plurality of second switching transistors T2 in each column are connected to different second control ports (G1, G2, G3, G4, and G5), so that the plurality of second switching transistors T2 are turned on at different times in turn to transmit the electrical signals of the plurality of second photosensors P2 to the second output circuit 41 in turn.

Figure 6:
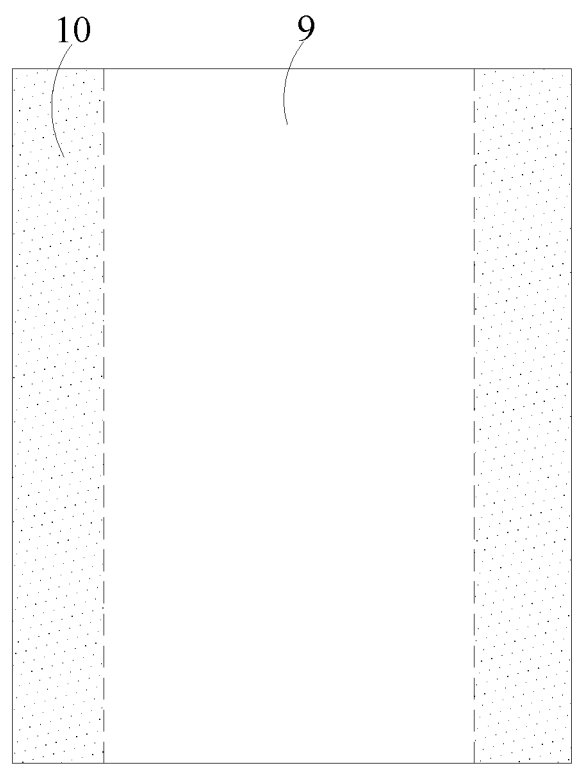
FIG. 6 is a structural schematic diagram of a third exemplary embodiment of an image acquisition structure of the present disclosure.
Figure 7:
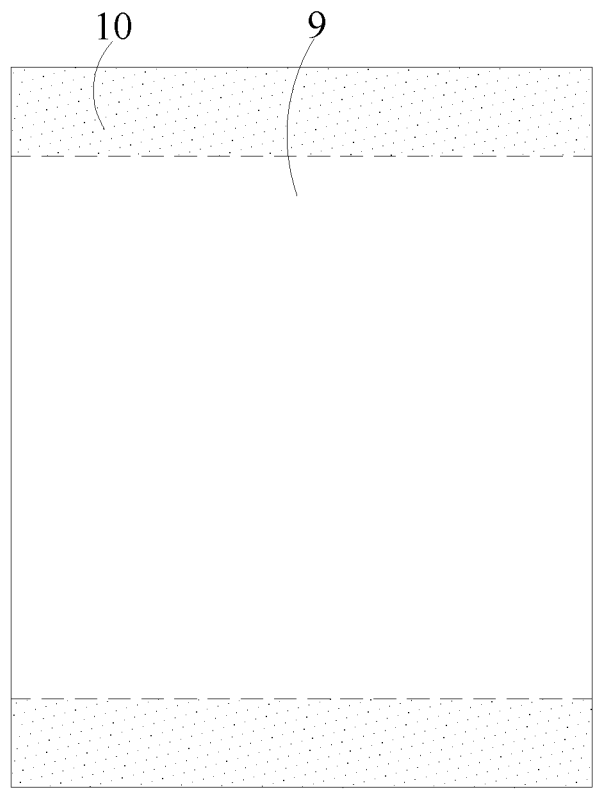
FIG. 7 is a structural schematic diagram of a fourth exemplary embodiment of an image acquisition structure of the present disclosure.

Referring to FIG. 6 and FIG. 7, in still other exemplary embodiments of the present disclosure, the reference area 10 may be provided as two, and two reference areas 10 may be provided in symmetrical edge regions on both sides of the image acquisition structure. The plurality of first photosensors P1 and the plurality of first switching transistors T1 are provided in one reference area 10, and one first photosensor P1 is connected to one first switching transistor T1 correspondingly, which are arranged in an array after connection, the plurality of first photosensors P1 in each column correspond to the same first output circuit 21. The control terminals of the plurality of first switching transistors T1 connected to the same first output circuit 21 are connected to different first control ports, thus on/off between the plurality of first photosensors P1 and one first output circuit 21 may be controlled respectively, so that electrical signals output by the plurality of first photosensors P1 are transmitted to the first output circuit 21 in turn. The arrangement and connection of the image acquisition circuit 4 in the image acquisition area 9 may be the same as that in FIG. 4, and will not be detailed here.

Figure 8:
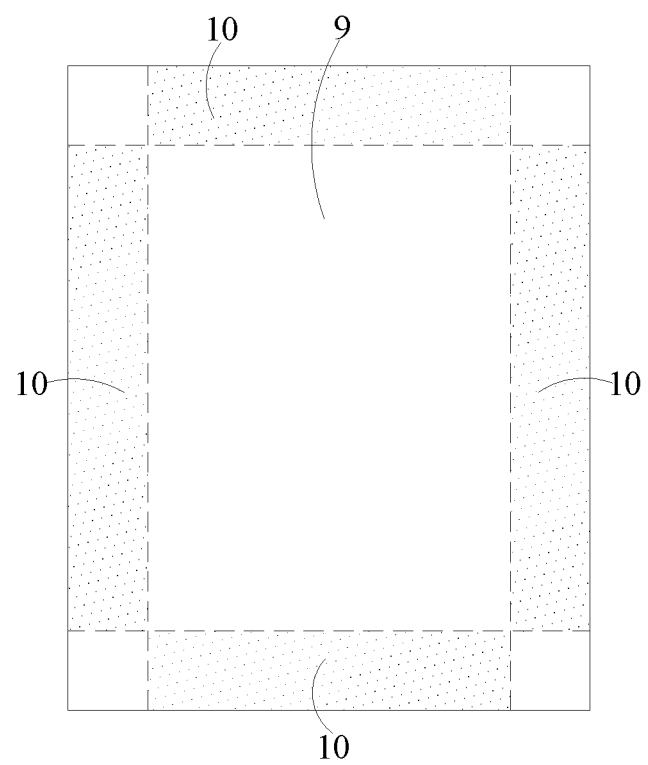
FIG. 8 is a structural schematic diagram of a fifth exemplary embodiment of an image acquisition structure of the present disclosure.

Referring to FIG. 8, in yet other exemplary embodiments of the present disclosure, the reference area 10 may be provided as four, and four reference areas 10 may be provided in symmetrical edge regions on four sides of the image acquisition structure. The plurality of first photosensors P1 and the plurality of first switching transistors T1 are provided in one reference area 10, and one first photosensor P1 is connected to one first switching transistor T1 correspondingly, which are arranged in an array after connection, the plurality of first photosensors P1 in each column correspond to the same first output circuit 21. The control terminals of the plurality of first switching transistors T1 connected to the same first output circuit 21 are connected to different first control ports, thus on/off between the plurality of first photosensors P1 and one first output circuit 21 may be controlled respectively, so that the electrical signals output by the plurality of first photosensors P1 are transmitted to the first output circuit 21 in turn. The arrangement and connection of the image acquisition circuit 4 in the image acquisition area 9 may be the same as that in FIG. 4, and will not be detailed here.

Of course, in the case of the arrangement of the reference areas 10 illustrated in FIGS. 4 to 8, it may also be that the plurality of first photosensors P1 in a plurality of columns correspond to the same first output circuit 21, for example, each reference area 10 has two columns of first photosensors P1, each column has eight first photosensors P1, four first photosensors P1 at one end in two columns, that is, a total of eight first photosensors P1 correspond to the same first output circuit 21; the four first photosensors P1 at the opposite end in two columns, that is, a total of eight first photosensors P1 correspond to the same other first output circuit 21. Just make sure that the control terminals of the plurality of first switching transistors T1 connected to the same first output circuit 21 are connected to different first control ports.

Figure 9:
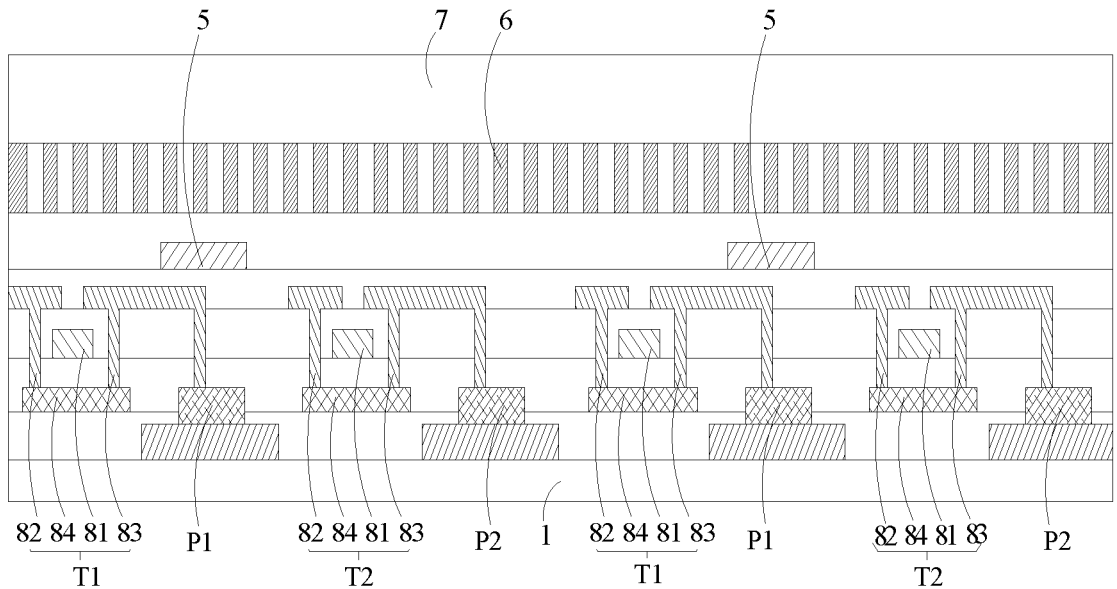
FIG. 9 is a structural schematic diagram of an exemplary embodiment of a display device of the present disclosure.

Furthermore, the exemplary embodiment also provides a display device. Referring to a structural schematic diagram of a display device of the present disclosure illustrated in FIG. 9, the display device may include the image acquisition structure according to any one of above items. The specific structure of the image acquisition structure has been described in detail above, so it will not be detailed here.

The display device may further include an optical path structure 6 provided above the image acquisition structure. The optical path structure 6 includes a light shielding plate, and a plurality of through holes are provided on the light shielding plate, which allow light rays to pass through and may reduce stray light. A display module 7 is provided on a side of the optical path structure 6 away from the image acquisition structure. The display module 7 may be an OLED display module or a liquid crystal display module. Its specific structure will not be detailed here.

Figure 10:
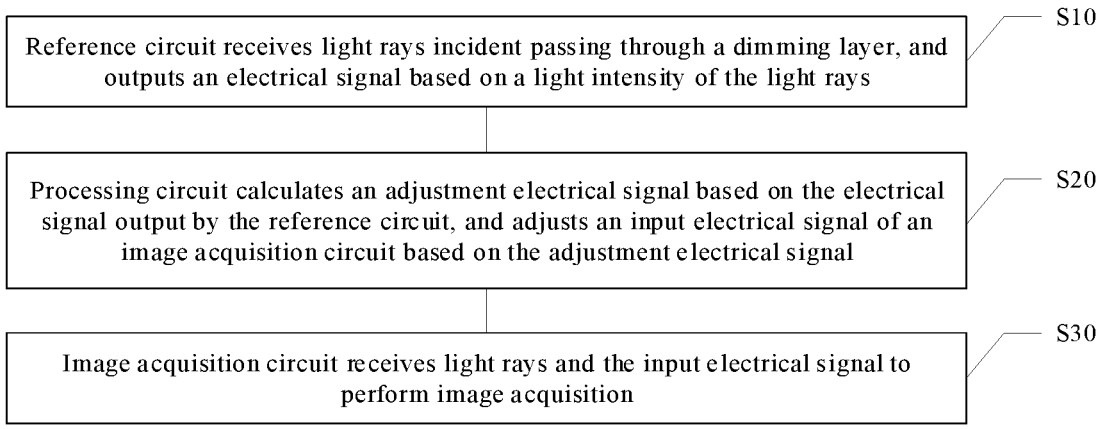
FIG. 10 is a flow schematic block diagram of an exemplary embodiment of a driving method for an image acquisition structure of the present disclosure.

Furthermore, the exemplary embodiment also provides a driving method for an image acquisition structure. Referring to a flow schematic block diagram of an exemplary embodiment of a driving method for an image acquisition structure of the present disclosure illustrated in FIG. 10, the driving method is suitable for the image acquisition structure according to any one of above items, the driving method may include the following steps:

Step S10, a reference circuit 2 receives light rays incident passing through a dimming layer 5, and outputs an electrical signal based on a light intensity of the light rays;

Step S20, a processing circuit 3 calculates an adjustment electrical signal based on the electrical signal output by the reference circuit 2, and adjusts an input electrical signal of an image acquisition circuit 4 based on the adjustment electrical signal; and Step S30, the image acquisition circuit 4 receives light rays and the input electrical signal to realize an image acquisition.

In the exemplary embodiment, first of all, it is necessary to establish a corresponding relationship between the adjustment electrical signal and the input electrical signal of the image acquisition circuit 4 under different light intensities, and store it in a processor 32 of the processing circuit 3. The specific implementation process of the corresponding relationship establishment is as follows: in the following, take one reference circuit 2 including one first photosensor P1, one image acquisition circuit 4 including one second photosensor P2, and one reference circuit 2 corresponding to one image acquisition circuit 4 as an example for description: set an initial voltage of a first electrode (anode) of the second photosensor P2 to −3.5V.

Step 01, adjust the light intensity linearly from low to high. When signal quantity of the second photosensor P2 is close to saturation, set a saturation threshold T1=35000 at this time, record voltage values of the electrical signal output by the reference circuit 2 and the first electrode (anode) of the second photosensor P2 at this time and obtain a first set of data. Of course, in the case where one reference circuit 2 includes a plurality of first photosensors P1, a calculation relationship between the adjustment electrical signal and the electrical signal output by the reference circuit 2 will be described in detail below.

Step 02, continuously increase the light intensity linearly and reduce the voltage of the first electrode (anode) of the second photosensor P2. Repeat step 01 to obtain a second set of data, test in turn to obtain a plurality of sets of data, and establish the corresponding relationship between the adjustment electrical signal and the input electrical signal of the image acquisition circuit 4 under different light intensities based on the plurality of sets of data.

The first photosensor P1 receives the light rays incident passing through the dimming layer 5, and converts an optical signal into a current signal. The magnitude of the current signal is proportional to the intensity of the light rays. A first operational amplifier K1 and a first capacitor C1 constitute an integrator. The integrator may integrate the current signal to obtain a voltage signal, that is, the electrical signal output by the reference circuit is the voltage signal, which is convenient for reading and processing of the processing circuit 3 subsequently.

An analog-to-digital conversion circuit 31 in the processing circuit 3 converts the electrical signal(s) (voltage signal(s)) output by one or more reference circuits 2 into a digital signal(s); the processor 32 calculates the adjustment electrical signal (adjustment digital signal) based on the digital signal(s), and finds an input digital signal required by the image acquisition circuit 4 corresponding to the adjustment digital signal from the corresponding relationship; a digital-to-analog conversion circuit 33 converts the input digital signal into the input electrical signal.

In the image acquisition structure illustrated in FIG. 2, in the case where one reference circuit 2 corresponds to one image acquisition circuit 4, the electrical signal output by one reference circuit 2 corresponds to one adjustment electrical signal.

In the image acquisition structure illustrated in FIGS. 4 to 8, in the case where a plurality of reference circuits 2 correspond to a plurality of image acquisition circuits 4, the adjustment electrical signal may be calculated by an average value or a median value of the electrical signals output by the plurality of reference circuits 2. The adjustment digital signal may also be calculated by the following formula, which takes the first photosensors P1 of 3×3 array as an example for calculation.

$$\Delta p(x, y) = K \cdot I \begin{bmatrix} (x-1, y-1) & (x, y-1) & (x+1, y-1) \\ (x-1, y) & (x, y) & (x+1, y) \\ (x-1, y+1) & (x, y+1) & (x+1, y+1) \end{bmatrix},$$

where $\Delta p(x, y)$ is the adjustment electrical signal (adjustment digital signal), K is a convolution kernel, I is an image formed by the first photosensors P1 of the 3×3 array, x is a first coordinate value of a middle pixel in the image, and y is a second coordinate value of the middle pixel in the image.

By selecting different convolution kernels, different compensation strategies are selected, for example:

$$K = \frac{1}{12} \begin{bmatrix} 1 & 2 & 1 \\ 2 & 0 & 2 \\ 1 & 2 & 1 \end{bmatrix},$$

In addition, in other exemplary embodiments of the present disclosure, Gaussian convolution may also be selected.

The stronger the light intensity is, the greater the adjustment electrical signal (adjustment digital signal) is, and the smaller the input electrical signal of the image acquisition circuit 4 is.

The image acquisition circuit 4 receives the light rays reflected by the fingerprint and the above input electrical signal to realize the image acquisition. Moreover, under a condition of strong ambient light, the input electrical signal of the image acquisition circuit 4 is small enough to avoid the saturation of the second photosensor P2, and a phenomenon that a fingerprint image cannot be recognized will not occur.

The features, structures, or characteristics described above may be combined in one or more embodiments in any suitable manner. If possible, the features discussed in each embodiment are interchangeable. In the above description, many specific details are provided to give a sufficient understanding of the embodiments of the present disclosure. However, those skilled in the art will realize that the technical solutions of the present disclosure may be practiced without one or more of the specific details, or other methods, components, materials, etc. may be adopted. In other cases, well-known structures, materials, or operations are not shown or described in detail to avoid obscuring aspects of the present disclosure.

Although relative terms such as "up" and "down" are used in this specification to describe the relative relationship between one component of an icon to another component, these terms are used in this specification only for convenience, for example, based on the direction of the example described in the accompanying drawings. It can be understood that if the device of the icon is turned upside down, the component described above as "upper" will become the "lower" component. Other relative terms such as "high", "low", "top", and "bottom" have similar meanings. When a structure is "on" another structure, it may mean that a certain structure is integrally formed on other structures, or that a certain structure is "directly" installed on other structures, or that a certain structure is "indirectly" installed on other structures through another structure.

In this specification, the terms "one", "an", "the", "said" and "at least one" are used to indicate the presence of one or more elements/components/etc.; the terms "contain", "include" and "have" are used to indicate the meaning of open inclusion and mean that in addition to the listed elements/components/etc., there may be additional elements/components/etc.; the terms "first", "second" and "third" are only used as markers, not as a quantitative restriction on their objects.

It should be understood that the present disclosure does not limit its application to the detailed structure and arrangement of components proposed in this specification. The present disclosure may have other embodiments and may be implemented and executed in various ways. The aforementioned deformation forms and modification forms fall within the scope of the present disclosure. It should be understood that the present disclosure disclosed and defined in this specification extends to all alternative combinations of two or more individual features mentioned or obvious in the text and/or drawings. All these different combinations constitute multiple alternative aspects of the disclosure. The embodiments described in this specification illustrate the best mode known for implementing the present disclosure, and will enable those skilled in the art to utilize the present disclosure.

What is claimed is:

1. An image acquisition structure, comprising:
   a plurality of reference circuits, the reference circuit comprising a first photosensor;
   a dimming layer provided on a light incident side of the first photosensor, the dimming layer covering at least the first photosensor of the reference circuit;
   a processing circuit having an input terminal electrically connected to an output terminal of the reference circuit; and
   a plurality of image acquisition circuits having input terminals electrically connected to an output terminal of the processing circuit;
   wherein the reference circuit is configured to receive light rays incident passing through the dimming layer, and output an electrical signal based on a light intensity of the light rays; the processing circuit is configured to calculate an adjustment electrical signal based on the electrical signal output by the reference circuit, and adjust an input electrical signal of the image acquisition circuit based on the adjustment electrical signal; and the image acquisition circuit is configured to receive light rays incident without passing through the dimming layer and the input electrical signal to perform image acquisition.

2. The image acquisition structure according to claim 1, wherein the reference circuit further comprises:
   a first switching transistor having a first terminal electrically connected to a second electrode of the first photosensor and a control terminal electrically connected to a first control port; and
   a first output circuit having an input terminal electrically connected to a second terminal of the first switching transistor and an output terminal electrically connected to the processing circuit;
   wherein a first electrode of the photosensor is connected to a power input terminal.

3. The image acquisition structure according to claim 2, wherein the first output circuit comprises:
   a first operational amplifier having an input terminal connected to the second terminal of the first switching transistor, a reference terminal electrically connected to a first reference voltage terminal and an output terminal electrically connected to the processing circuit; and
   a first capacitor having a first terminal electrically connected to the input terminal of the first operational amplifier and a second terminal electrically connected to the output terminal the first operational amplifier.

4. The image acquisition structure according to claim 2, wherein the processing circuit comprises:
   an analog-to-digital conversion circuit having an input terminal electrically connected to the output terminal of the first output circuit;
   a processor having an input terminal electrically connected to an output terminal of the analog-to-digital conversion circuit; and
   a digital-to-analog conversion circuit having an input terminal electrically connected to an output terminal of the processor and an output terminal electrically connected to the image acquisition circuit.

5. The image acquisition structure according to claim 2, wherein the image acquisition circuit comprises:
   a second photosensor having a first electrode electrically connected to the processing circuit;
   a second switch transistor having a first terminal electrically connected to a second electrode of the second photosensor and a control terminal electrically connected to a second control port; and
   a second output circuit having an input terminal electrically connected to a second terminal of the second switch transistor.

6. The image acquisition structure according to claim 5, wherein the second output circuit comprises:
   a second operational amplifier having an input terminal electrically connected to the second terminal of the second switching transistor and a reference terminal electrically connected to a second reference voltage terminal; and
   a second capacitor having a first terminal electrically connected to the input terminal of the second operational amplifier and a second terminal electrically connected to an output terminal the second operational amplifier.

7. The image acquisition structure according to claim 5, wherein a plurality of the first photosensors are arranged in an array, each of the first photosensors corresponds to one first switching transistor, the plurality of the first photosensors in at least one column correspond to a same first output circuit, the control terminals of the first switch transistors connected to the same first output circuit are connected to different first control ports; and
   a plurality of the second photosensors are arranged in an array, each of the second photosensors corresponds to one first switching transistor, the plurality of the second photosensors in at least one column correspond to a same second output circuit, the control terminals of the second switch transistors connected to the same second output circuit are connected to different second control ports.

8. The image acquisition structure according to claim 7, wherein the image acquisition structure has at least one reference area comprising a reference area provided in an edge region of the image acquisition structure, each of the at least one reference areas is provided with multiple first photosensors and multiple first switching transistors, and the adjustment electrical signal is an average value or a median value of the plurality of the reference circuits.

9. The image acquisition structure according to claim 1, wherein at least one of the reference circuits is provided between two adjacent image acquisition circuits, and at least one of the image acquisition circuits is controlled by at least one of the reference circuits.

10. The image acquisition structure according to claim 1, wherein a light transmittance of the dimming layer is greater than or equal to 20% and less than or equal to 40%.

11. A display device comprising an image acquisition structure, wherein the image acquisition structure comprises:
   a plurality of reference circuits, the reference circuit comprising a first photosensor;
   a dimming layer provided on a light incident side of the first photosensor, the dimming layer covering at least the first photosensor of the reference circuit;
   a processing circuit having an input terminal electrically connected to an output terminal of the reference circuit; and
   a plurality of image acquisition circuits having input terminals electrically connected to an output terminal of the processing circuit;
   wherein the reference circuit is configured to receive light rays incident passing through the dimming layer, and output an electrical signal based on a light intensity of the light rays; the processing circuit is configured to calculate an adjustment electrical signal based on the electrical signal output by the reference circuit, and adjust an input electrical signal of the image acquisition circuit based on the adjustment electrical signal; and the image acquisition circuit is configured to receive light rays incident without passing through the dimming layer and the input electrical signal to perform image acquisition.

12. The display device according to claim 11, wherein the reference circuit further comprises:
   a first switching transistor having a first terminal electrically connected to a second electrode of the first photosensor and a control terminal electrically connected to a first control port; and
   a first output circuit having an input terminal electrically connected to a second terminal of the first switching transistor and an output terminal electrically connected to the processing circuit;
   wherein a first electrode of the photosensor is connected to a power input terminal.

13. The display device according to claim 12, wherein the first output circuit comprises:
   a first operational amplifier having an input terminal connected to the second terminal of the first switching transistor, a reference terminal electrically connected to a first reference voltage terminal and an output terminal electrically connected to the processing circuit; and a first capacitor having a first terminal electrically connected to the input terminal of the first operational amplifier and a second terminal electrically connected to the output terminal the first operational amplifier.

14. The display device according to claim 12, wherein the processing circuit comprises:

an analog-to-digital conversion circuit having an input terminal electrically connected to the output terminal of the first output circuit;

a processor having an input terminal electrically connected to an output terminal of the analog-to-digital conversion circuit; and a digital-to-analog conversion circuit having an input terminal electrically connected to an output terminal of the processor and an output terminal electrically connected to the image acquisition circuit.

15. The display device according to claim 12, wherein the image acquisition circuit comprises:

a second photosensor having a first electrode electrically connected to the processing circuit;

a second switch transistor having a first terminal electrically connected to a second electrode of the second photosensor and a control terminal electrically connected to a second control port; and a second output circuit having an input terminal electrically connected to a second terminal of the second switch transistor.

16. The display device according to claim 15, wherein the second output circuit comprises:

a second operational amplifier having an input terminal electrically connected to the second terminal of the second switching transistor and a reference terminal electrically connected to a second reference voltage terminal; and a second capacitor having a first terminal electrically connected to the input terminal of the second operational amplifier and a second terminal electrically connected to an output terminal the second operational amplifier.

17. The display device according to claim 15, wherein a plurality of the first photosensors are arranged in an array, each of the first photosensors corresponds to one first switching transistor, the plurality of the first photosensors in at least one column correspond to a same first output circuit, the control terminals of the first switch transistors connected to the same first output circuit are connected to different first control ports; and a plurality of the second photosensors are arranged in an array, each of the second photosensors corresponds to one first switching transistor, the plurality of the second photosensors in at least one column correspond to a same second output circuit, the control terminals of the second switch transistors connected to the same second output circuit are connected to different second control ports.

18. The display device according to claim 17, wherein the image acquisition structure has at least one reference area comprising a reference area provided in an edge region of the image acquisition structure, each of the at least one reference areas is provided with multiple first photosensors and multiple first switching transistors, and the adjustment electrical signal is an average value or a median value of the plurality of the reference circuits.

19. The display device according to claim 11, wherein at least one of the reference circuits is provided between two adjacent image acquisition circuits, and at least one of the image acquisition circuits is controlled by at least one of the reference circuits.

20. A driving method for an image acquisition structure, wherein the image acquisition structure comprises: a plurality of reference circuits, the reference circuit comprising a first photosensor; a dimming layer provided on a light incident side of the first photosensor, the dimming layer covering at least the first photosensor of the reference circuit; a processing circuit having an input terminal electrically connected to an output terminal of the reference circuit; and a plurality of image acquisition circuits having input terminals electrically connected to an output terminal of the processing circuit, the method comprises:

receiving, by the reference circuit, light rays incident passing through the dimming layer and outputting an electrical signal based on a light intensity of the light rays;

calculating, by the processing circuit, an adjustment electrical signal based on the electrical signal output by the reference circuit, and adjusting an input electrical signal of the image acquisition circuit based on the adjustment electrical signal; and receiving, by the image acquisition circuit, light rays and the input electrical signal to perform image acquisition.

* * * * *